2,804,741

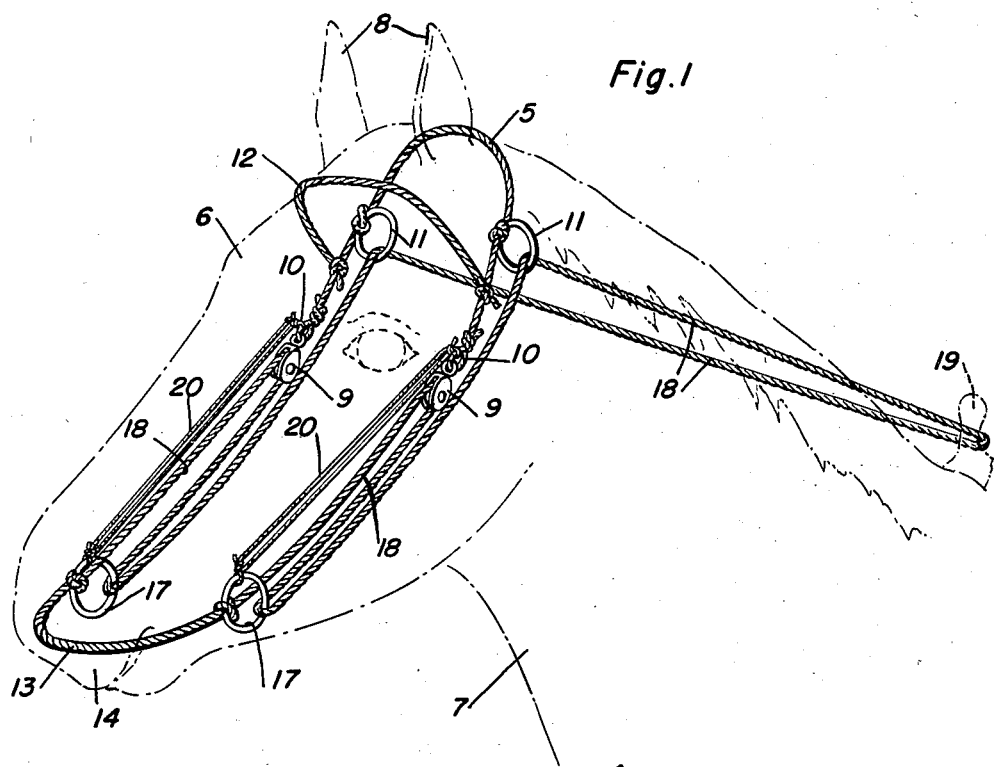
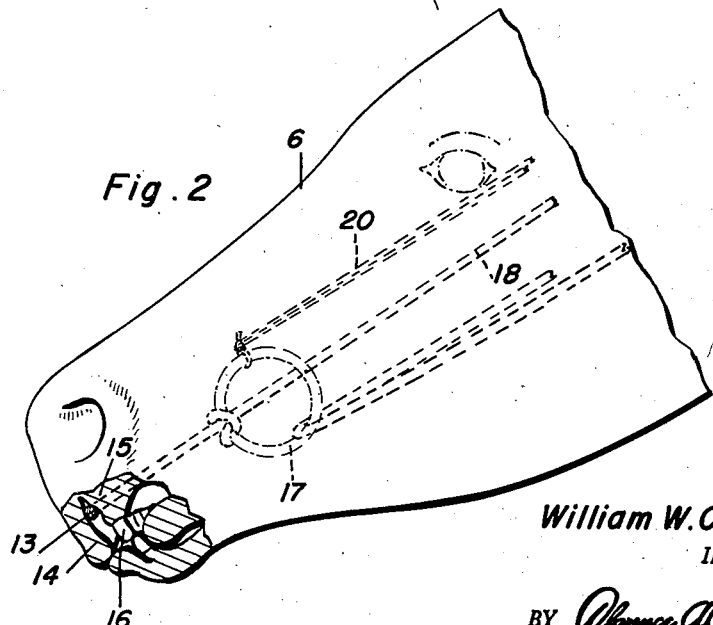
William W. Cheesebro
INVENTOR.

HORSE RESTRAINING DEVICE

William W. Cheesebro, Niota, Ill.

Application June 30, 1954, Serial No. 440,361

1 Claim. (Cl. 54—16)

The present invention relates to new and useful improvements in horse restraining devices, and has for its primary object to provide, in a manner as hereinafter set forth, a device of this character comprising novel means for preventing the animal from lowering its head, thereby preventing bucking.

Another very important object of the invention is to provide a restraining device of the aforementioned character which is adapted to be readily adjusted for size.

Still another important object of the invention is to provide a restraining device of the character described which will not injure the animal and which may be readily used under the usual bridle.

Other objects of the invention are to provide a horse restraining device of the character set forth which will be comparatively simple in construction, strong, durable, compact, light in weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view, showing a restraining device in accordance with the present invention in use; and Figure 2 is a view in side elevation of the animal's head with a portion of the mouth broken away in section to reveal the position of the lip loop.

Referring now to the drawing in detail, it will be seen that the embodiment of the invention which has been illustrated comprises a head loop 5 of suitable rope. The loop 5 is adapted to be positioned over the head 6 of the animal, as at 7, closely behind the ears 8. Pulleys 9 are suspended from the ends of the head loop 5 through the medium of loops 10. Upper guide rings 11 are knotted to the head loop 5 in spaced relation above the pulleys 9. A brow band 12 has its end portions adjustably secured to the head loop 5 between the rings 11 and the loops 10.

Suspended from the head loop 5 is a lip loop 13, also of suitable rope. As shown to advantage in Figure 2 of the drawing, the loop 13 is insertable under the upper lip 14 of the animal for engagement with the upper gum 15 above the upper teeth 16.

Knotted to the lip loop 13 adjacent the sides of the animal's jaws is a pair of lower guide rings 17. The lip loop 13 is formed integrally with a pair of check reins 18 which are trained over the pulleys 9 and pass downwardly therefrom through the lower rings 17. From the rings 17, the reins 18 extend upwardly through the rings 11 and then rearwardly where they are anchored to the usual post of a conventional saddle.

Adjusting cords 20 extend between the loops 10 and the rings 17 for connecting the loops 5 and 13 and for suspending said rings from said loop 5. The cords 20 facilitate adjustment for size while at the same time retaining the loop 13 in the correct position in the mouth beneath the upper lip 14 without discomfort to the animal.

It is thought that the operation of the device will be readily apparent from a consideration of the foregoing. As is well known, the animal's gums and the area immediately in back of the ears are tender or sensitive spots. While not taut, the restraining device is adjusted to eliminate slack. Should the animal attempt to lower its head with the reins anchored at 19, the loops 5 and 13 will be drawn together for applying pressure to the upper gums and to the head closely adjacent the ears, thus causing the animal to desist. Through the medium of the members 10 and 20, the device may be readily adjusted to accommodate heads of different sizes. As hereinbefore indicated, the construction and arrangement is such that the device may be readily used under a conventional bridle.

It is believed that the many advantages of a restraining device constructed in accordance with the present invention will be readily understood and although a preferred embodiment of said device is as illustrated and described, it is to be understood that changes in the details of construction may be resorted to which will fall within the scope of the invention as claimed.

What is claimed is:

A horse restraining device comprising: a head loop, pulleys of the ends of said head loop, upper rings on the head loop above and spaced from said pulleys, lower rings suspended from said ends of said head loop below and spaced from said pulleys, and a single, continuous length of flexible rope slidable through the upper rings, the lower rings and the pulleys and then knotted at spaced points to said lower rings for providing therebetween a flexible loop engageable between the upper gum and the upper lip of a horse, said rope further providing a pair of connected check reins between the upper rings.

References Cited in the file of this patent

UNITED STATES PATENTS

| 66,312 | Donehoo | July 2, 1867 |
| 70,089 | Hannaford | Oct. 22, 1867 |
| 130,794 | Duval | Aug. 27, 1872 |
| 214,883 | Carleton | Apr. 29, 1879 |
| 314,807 | Crawford | Mar. 31, 1885 |
| 540,408 | Small | June 4, 1895 |
| 843,689 | McClintock | Feb. 12, 1907 |